(12) United States Patent
Chun et al.

(10) Patent No.: US 9,001,799 B2
(45) Date of Patent: Apr. 7, 2015

(54) METHOD OF TRANSMITTING AND RECEIVING SIGNAL IN A DISTRIBUTED ANTENNA SYSTEM

(75) Inventors: Jin Young Chun, Anyang-si (KR); Ji Won Kang, Anyang-si (KR); Seung Hyun Kang, Anyang-si (KR); Ja Ho Koo, Anyang-si (KR); Bin Chul Ihm, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 263 days.

(21) Appl. No.: 13/638,738

(22) PCT Filed: Apr. 7, 2011

(86) PCT No.: PCT/KR2011/002431
§ 371 (c)(1),
(2), (4) Date: Oct. 1, 2012

(87) PCT Pub. No.: WO2011/126313
PCT Pub. Date: Oct. 13, 2011

(65) Prior Publication Data
US 2013/0064230 A1    Mar. 14, 2013

(30) Foreign Application Priority Data
Apr. 7, 2010  (KR) .................. 10-2010-0031756

(51) Int. Cl.
*H04J 3/00* (2006.01)
*H04W 4/00* (2009.01)
*H04B 7/212* (2006.01)
*H04B 7/02* (2006.01)
*H04W 72/04* (2009.01)
*H04W 16/28* (2009.01)
*H04W 88/08* (2009.01)

(52) U.S. Cl.
CPC ............... *H04B 7/024* (2013.01); *H04W 16/28* (2013.01); *H04W 72/046* (2013.01); *H04W 88/085* (2013.01)

(58) Field of Classification Search
CPC .............. H04W 88/187; H04W 74/04; H04W 72/0446; H04W 84/12; H04B 7/212; H04B 7/2123; H04B 7/2643; H04B 7/2656; H04L 12/2801
USPC .......................... 370/314, 321, 336, 337, 442
See application file for complete search history.

(56) References Cited

U.S. PATENT DOCUMENTS

| | | |
|---|---|---|
| 7,230,931 B2 * | 6/2007 | Struhsaker .................... 370/280 |
| 2008/0192702 A1 | 8/2008 | Song et al. |
| 2009/0092073 A1 | 4/2009 | Doppler et al. |
| 2009/0247067 A1 | 10/2009 | Li et al. |
| 2009/0316611 A1 | 12/2009 | Stratford et al. |

\* cited by examiner

*Primary Examiner* — Ronald Abelson
(74) *Attorney, Agent, or Firm* — McKenna Long & Aldridge LLP

(57) ABSTRACT

A method of transmitting a signal from a base station to a user equipment in a multi-node system comprises down-link-transmitting a signal at a first zone of a radio frame by using centralized antennas (CAs); and downlink-transmitting a signal at a second zone used for a backhaul link of a relay in the radio frame by using distributed nodes, wherein the first zone and the second zone are multiplexed by time division.

11 Claims, 7 Drawing Sheets

METHOD OF TRANSMITTING AND RECEIVING SIGNAL IN A DISTRIBUTED ANTENNA SYSTEM

This Application is a 35 U.S.C. §371 National Stage Entry of International Application No. PCT/KR2011/002431, filed Apr. 7, 2011 and claims the benefit of Korean Application No: 10-2010-0031756, filed Apr. 7, 2010, all of which are incorporated by reference in their entirety herein.

TECHNICAL FIELD

The present invention relates to a method of transmitting and receiving a signal in a multi-node system (e.g., DAS), and more particularly, to a method of transmitting a signal using a frame structure used in a multi-node system.

BACKGROUND ART

The multi-node system uses a plurality of nodes each of which may represent a base station, an access point, an antenna, an antenna group or a radio remote header (RRH). The plurality of nodes may be managed by one base station/base station controller which control and schedule the nodes' operation.

Distributed nodes connected with a single base station/base station controller through a cable or a dedicated line, wherein the single base station/base station controller manages a plurality of nodes located within a cell at predetermined intervals. This multi-node system may be regarded as a multiple input multiple output (MIMO) system in that distributed nodes can support a single user equipment or multiple user equipments by transmitting and receiving different data streams at the same time. In view of the MIMO system, the multi-node system is advantageous in that it can reduce a transmission power as a transmission zone is more reduced than that of the CAS due to nodes distributed at various locations within a certain geographical area. Also, the multi-node system can reduce path loss by reducing a transmission distance between a node and a user equipment, thereby enabling high rate transmission of data. As a result, the multi-node system can enhance transmission capacity and power efficiency of the cellular system, and can satisfy communication throughput of quality more relatively uniform than that of the CAS regardless of user location within the certain geographical area. Also, since the base station/base station controller(s) connected with a plurality of distributed nodes cooperates in the multi-node system, signal loss is reduced, and correlation and interference between the antennas are reduced, whereby a high signal to interference to noise ratio (SINR) can be obtained.

As described above, in order to reduce facility costs of the base station and maintenance costs of a backbone network in a next generation mobile communication system and at the same time extend service coverage and improve channel capacity and SINR, the multi-node system can be a new basis of cellular communication by being compatible with the existing CAS or replacing with the CAS.

DISCLOSURE OF INVENTION

Technical Problem

Based on the aforementioned discussion, an object of the present invention is to provide a method of performing communication considering a base station and a user equipment, which support a multi-node system, without affecting a user equipment operated in a conventional mobile communication system such as a CAS.

Another object of the present invention is to provide a method of performing communication using a subframe, where a user equipment does not perform any operation like a relay zone, as a multi-node system zone in a frame structure used for a relay function.

It is to be understood that technical objects to be achieved by the present invention are not limited to the aforementioned technical objects and other technical objects which are not mentioned will be apparent from the following description to the person with an ordinary skill in the art to which the present invention pertains.

Solution to Problem

To achieve these objects and other advantages and in accordance with the purpose of the invention, as embodied and broadly described herein, a method of transmitting a signal from a base station to a user equipment in a distributed antenna system (DAS) comprises downlink-transmitting a signal at a first zone of a radio frame by using centralized antennas (CAs); and downlink-transmitting a signal at a second zone used for a backhaul link of a relay in the radio frame by using distributed antennas (DAs), wherein the first zone and the second zone are multiplexed by time division.

The method further comprises broadcasting system configuration information and control information into a cell zone through the first zone, wherein the system configuration information indicates that a wireless communication system to which the base station belongs is a system that can use a relay station, and the control information indicates that the second zone is used as a DAS zone where the base station and the user equipment, which belong to the DAS, are operated.

Also, the method further comprises broadcasting system configuration information into a cell zone through the first zone, wherein the system configuration information indicates that a wireless communication system to which the base station belongs is a system that can use a relay station, has no relay station therein, and performs communication using a DAS.

Also, the method further comprises downlink-transmitting a message through the first zone, the message including configuration parameters for configuring the DAS. In this case, the configuration parameters include at least one of information on a total number of CAs and DAs of the base station, information on the number of DAs, index information of specific DAs associated with a user equipment that supports the DAS, information on the number of antennas corresponding to the specific DAs, and index information of antennas corresponding to the specific DAs.

In another aspect of the present invention, a method of receiving a signal in a user equipment, which belongs to a distributed antenna system (DAS), from a base station comprises downlink-receiving system configuration information and control information through centralized antennas (CAs) of the base station at a first zone of a radio frame, the system configuration information indicating that a wireless communication system is a system that can use a relay station, and the control information indicating that a second zone used for a backhaul link of the relay station in the radio frame is allocated as a DAS zone where the base station and the user equipment, which belong to the DAS, are operated; and downlink-receiving a signal from the second zone through distributed antennas (DAs) of the base station, wherein the first zone and the second zone are multiplexed by time division.

The method further comprises downlink-receiving a message through the first zone, the message including configuration parameters for configuring the DAS.

The configuration parameters include at least one of information on a total number of CAs and DAs of the base station, information on the number of DAs, index information of specific DAs associated with the user equipment, information on the number of antennas corresponding to the specific DAs, and index information of antennas corresponding to the specific DAs. In this case, the user equipment that has received the system configuration information, the control information and the message is not operated at the first zone.

In still another aspect of the present invention, a base station belonging to a distributed antenna system (DAS) comprises an antenna module including a plurality of centralized antennas (CAs) and a plurality of distributed antennas (DAs); a transmitting module for transmitting a signal; and a processor multiplexing a radio frame into a first zone and a second zone used for a backhaul link of a relay through time-division, downlink-transmitting a signal at the first zone through the CAs, and downlink-transmitting a signal at the second zone through the DAs.

The processor generates system configuration information, control information, and configuration parameters, and transmits them through the first zone, the system configuration information indicating whether a wireless communication system to which the base station belongs supports a relay station and a DAS, the control information indicating that the second zone is used as a DAS zone where the base station and the user equipment, which belong to the DAS, are operated, and the configuration parameters configuring the DAS zone.

In further still another aspect of the present invention, a user equipment belonging to a distributed antenna system (DAS) comprises a receiving module for receiving system configuration information and control information from a base station belonging to the DAS at a first zone of a radio frame, the system configuration information indicating that a wireless communication system to which the user equipment belongs is a system that can use a relay station, and the control information indicating that a second zone used for a backhaul link of the relay station in the radio frame is allocated as a DAS zone where the base station and the user equipment, which belong to the DAS, are operated; and a processor determining an operation at the first zone and the second zone based on the system configuration information and the control information, wherein the first zone and the second zone are multiplexed by time division.

The aforementioned embodiments are only a part of the preferred embodiments of the present invention, and various embodiments reflecting technical features of the present invention will be understood by the person with ordinary skill in the art based on the detailed description of the present invention.

Advantageous Effects of Invention

According to the embodiments of the present invention, it is possible to perform communication considering a base station and a user equipment, which support a multi-node system, without affecting a user equipment operated in a conventional mobile communication system such as a CAS.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR THE INVENTION

Figure 1:
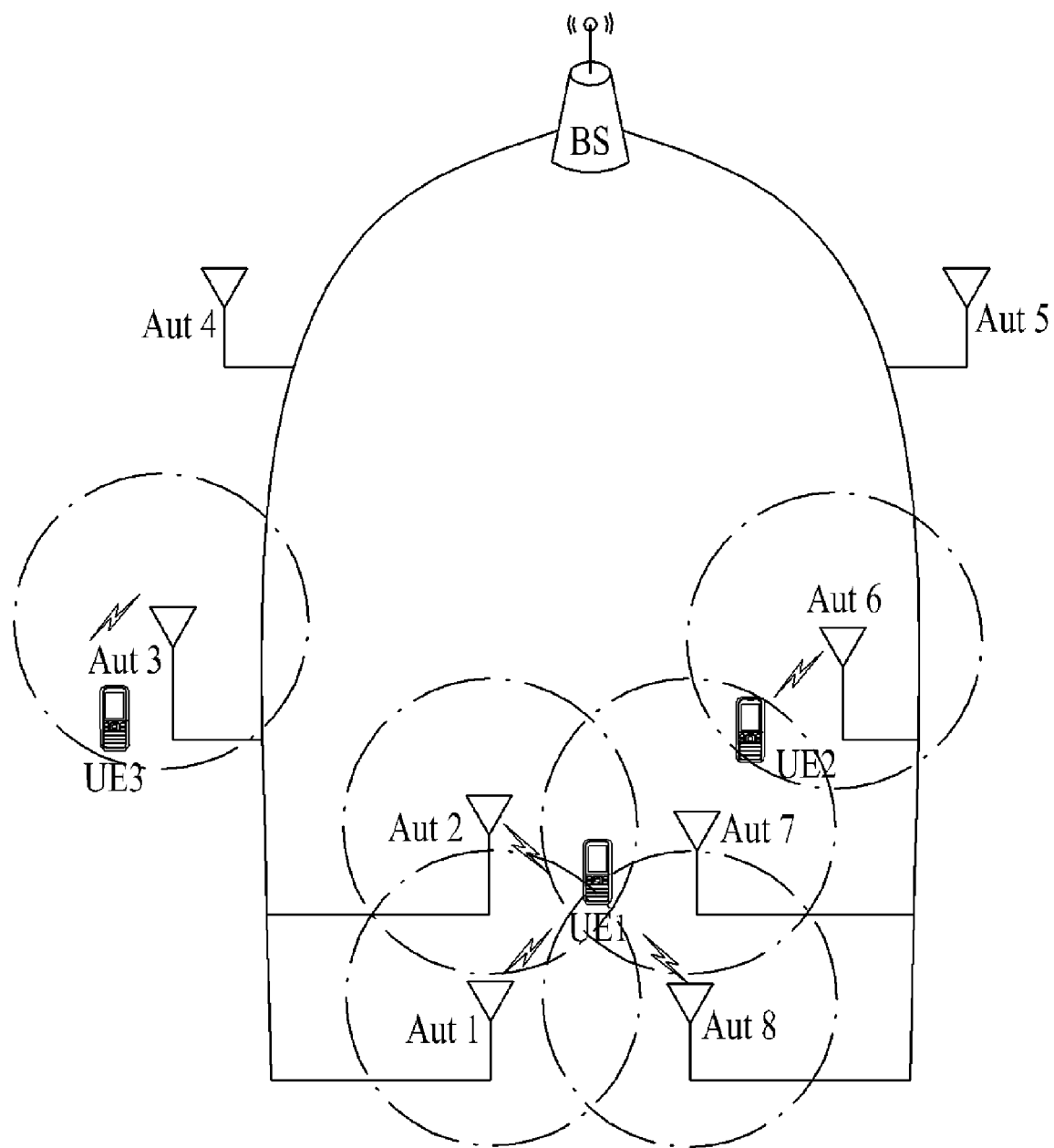
FIG. 1 is a diagram illustrating an example of a DAS structure to which the present invention is applied.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. Hereinafter, the following detailed description includes detailed matters to provide full understanding of the present invention. However, it will be apparent to those skilled in the art that the present invention can be carried out without the detailed matters. For example, although the following description will be made based on an institute electrical and electronics engineers (IEEE) 802.16 system, the following description can be applied to various wireless communication systems, such as a 3rd generation partnership project (3GPP) system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Moreover, in the following description, it is assumed that a user equipment (UE) will refer to a mobile station (MS), or a mobile or fixed type user terminal device. Also, it is assumed that a base station will refer to a random node of a network terminal that performs communication with a user equipment, such as Node B (NB), eNode B (eNB), and processing server (PS).

The present invention can be applied to various types of multi-node systems. For example, embodiments of the present invention can be applied to the multi-node system such as a distribute antenna system (DAS), macro-node with low-power RRHs, a multi-base station cooperative system, a femto-/pico-cell cooperative system, a combination thereof and etc. One or more base stations connected to the plurality of nodes in the multi-node system can cooperate to simultaneously transmit/receive a signal to/from a user equipment.

The DAS uses a plurality of distributed antennas connected with a single base station/base station controller through a cable or a dedicated line, wherein the single base station/base station controller manages a plurality of antennas located at predetermined interval within a certain geographical region (also called a cell) managed by the single base station/base station controller. Each antenna and/or each antenna group in the DAS can be a node of the multi-node system of the present invention, and each node of the DAS operates as a subset of antennas equipped in the single base station. The DAS is a kind of multi-node system, and the distributed antenna or antenna group in DAS is a kind of node in multi-node system. The DAS provided with a plurality of antennas located within a cell at predetermined intervals is different from a centralized antenna system (CAS) provided with a plurality of antennas centralized at the center of a cell. The DAS is different from a femto cell in that all distributed antennas located within a cell are managed by a base station/base station controller at the center of the cell not each unit of the distributed antennas. Also, the DAS is different from a multi-hop relay system or ad-hoc network in that distributed antenna units are connected with one another through a cable or a dedicated line, wherein the multi-hop relay system or ad-hoc network include a base station connected with a relay station (RS) through a wireless mode. Moreover, the DAS is different from a repeater, which simply amplifies and transmits a signal, in that each of distributed antennas can transmit different signals to different user equipments located near the antennas in accordance with a command of a base station/base station controller.

Each node of the multi-base station cooperative system, or the femto-cell or pico-cell cooperative system operates as an independent base station and cooperates with each other. Each base station of the multi-base station cooperative system or the femto-/pico-cell cooperative system can be a node in the multi-node system of the present invention. The multiple nodes of the multi-base station cooperative system, or the femto-cell or the pico-cell cooperative system are connected with one another via a backbone network and the like, and perform cooperative transmission/reception by performing scheduling and/or handover together.

Although there are differences among the DAS, macro-node with low-power RRHs, the multi-base station cooperative system, the femto-/the pico-cell cooperative system, and etc, embodiments of the present invention can be applied to them all since they are different from a single-node system (e.g., a CAS, a conventional MIMO system, a conventional relay system, a conventional repeater system, and etc.) and a plurality of nodes of them participate in providing communication service for a user equipment in cooperative manner. Hereinafter, for the convenience's sake of description, the present invention will be described, taking an example of the DAS. However, the following description is only an exemplary, and the present invention is also applicable to other multi-node system in the same manner since an antenna or an antenna group of the DAS can be corresponding to a node of other multi-node system and a single base station of the DAS can be corresponding to one or more cooperative base stations of other multi-node system.

FIG. 1 is a diagram illustrating an example of a DAS structure to which the present invention is applied.

The base station illustrated in FIG. 1 may include a plurality of antennas located at the center of a cell in accordance with a CAS. For conciseness of description, however, DAS antennas are only illustrated in FIG. 1. In a DAS, a plurality of antennas connected with a single base station, which is located within a cell, through a cable are distributed at various locations within the cell. This DAS can be configured in various manners depending on the number and location of antennas. For example, a plurality of antennas may be distributed within the cell at constant intervals or two or more antennas may be centralized at a specific place. If coverage of each of the distributed antennas is overlapped with that of another distributed antenna, signal transmission of rank 2 or more can be performed in the DAS regardless of the location of the distributed antennas within the cell. Rank means the number of data streams that can be transmitted at the same time through one or more antennas.

Referring to FIG. 1, one base station that provides communication service to one cell zone is connected with a total of eight antennas through a cable, wherein the respective antennas are located at constant intervals or various intervals within the cell. In the DAS, all the antennas connected with the base station are not needed to be used, and a proper number of antennas can be used based on their signal transmission range, an overlap level of coverage and interference with their neighboring antenna, and the distance with the user equipment. For example, if three user equipments (UE 1 to UE 3) are located within the cell and UE 1 is located within a signal transmission range of the antennas 1, 2, 7 and 8 as illustrated in FIG. 1, the UE 1 can receive a signal from one or more of the antennas 1, 2, 7 and 8 of the base station. On the other hand, in view of the UE 1, it is likely that high path loss may occur in signals transmitted from the antennas 3, 4, 5 and 6 and power consumption may be increased therein due to a long distance between the corresponding antennas and the user equipment UE 1. It is likely that the signals transmitted from the antennas 3, 4, 5 and 6 may have small intensity that may be disregarded. For another example, since the UE 2 is located in a portion where the signal transmission range of the antenna 6 is overlapped with that of the antenna 7, the signals transmitted through the other antennas except for the antennas 6 and 7 may be small or weak values that may be disregarded. Also, since the UE 3 is located within a neighboring distance of the antenna 3, it can exclusively receive the signal transmitted through the antenna 3.

As illustrated in FIG. 1, if a plurality of antennas are spaced apart from one another within the cell of the DAS, the DAS is operated like a MIMO system. The base station can perform communication with the UE 1 through an antenna group 1 configured by one or more of the antennas 1, 2, 7 and 8, communication with the UE 2 through an antenna group 2 configured by one or more of the antennas 6 and 7, and communication with the UE 3 through the antenna 3. At this time, the antennas 4 and 5 may perform transmission for the UE 3 and the UE 2, respectively, or may be operated in an idle state.

In other words, the DAS may transmit various numbers of data streams for each user equipment during communication with a single user/multiple users. Also, various antennas or antenna groups may be allocated to user equipments located within the cell supported by the base station in the DAS. A specific antenna or antenna group, which performs communication with a user equipment, may be defined depending on the location of the corresponding user equipment located within the cell. Alternatively, the antenna or antenna group, which performs communication with a user equipment, may adaptively be changed depending on movement of the user equipment within the cell.

Figure 2:
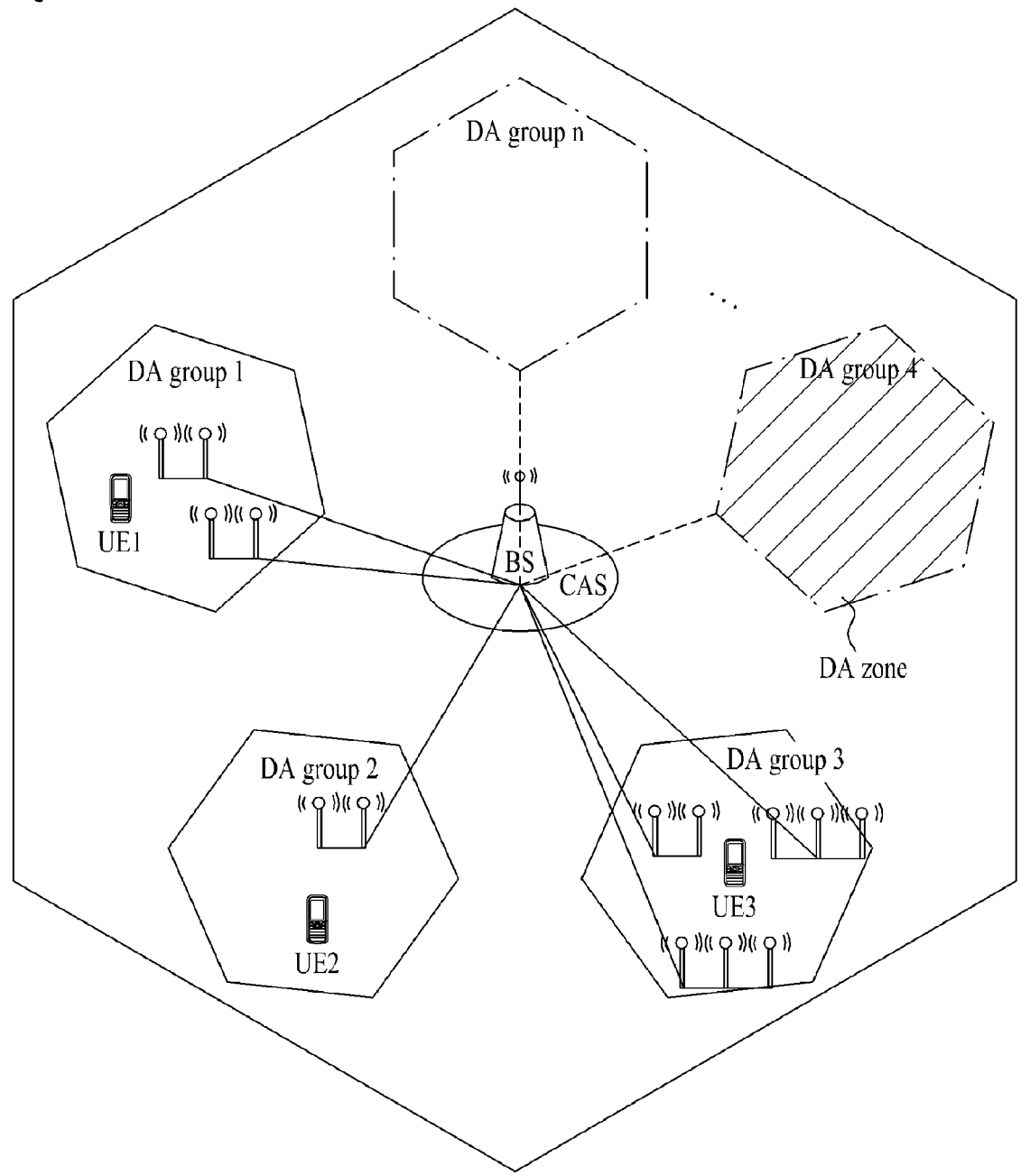
FIG. 2 is a diagram illustrating another example of a DAS structure to which the present invention is applied.

FIG. 2 is a diagram illustrating another example of a DAS structure to which the present invention is applied. In more detail, FIG. 2 illustrates an example of a system structure when a DAS is applied to a centralized antenna system that uses cell based multiple antennas according to the related art.

Referring to FIG. 2, a plurality of centralized antennas (CAs) having a similar effect in path loss due to an antenna interval shorter than a cell radius may be located at the center of a cell zone adjacent to the base station, wherein the cell zone is supported by the base station. Also, a plurality of distributed antennas (DAs) having different effects in path loss due to an antenna interval longer than the antenna interval of the CAs may be located at predetermined intervals within the cell zone. The DAs are configured by one or more antennas connected to the base station through one cable. The one or more DAs form one DA group, thereby forming a DA zone. The one or more DAs forming one DA group can correspond to a node in the multi-node system.

The DA group, which includes one or more DAs, may variably be configured depending on the location or receiving status of the user equipment, or may fixedly configured (by the number of maximum antennas used in MIMO). According to the IEEE 802.16m, the number of maximum antennas is 8Tx. The DA zone is defined by the range that the antennas constituting the DA group can transmit or receive a signal. The cell zone illustrated in FIG. 2 includes n number of DA zones. The user equipment that belongs to the DA zone can perform communication with one or more the DAs constituting the DA zone, and the base station can increase a transmission rate by using the DAs and the CAs at the same time during signal transmission to the user equipment belonging to the DA zone.

A CAS that includes a DAS is illustrated in FIG. 2, whereby the base station and the user equipment can use the DAS in the CAS structure that uses multiple antennas according to the related art. Although the CAs and the DAs are located separately in FIG. 2 for conciseness of description, they may be located in various manners depending on their embodiments without limitation to the example of FIG. 2.

Figure 3:
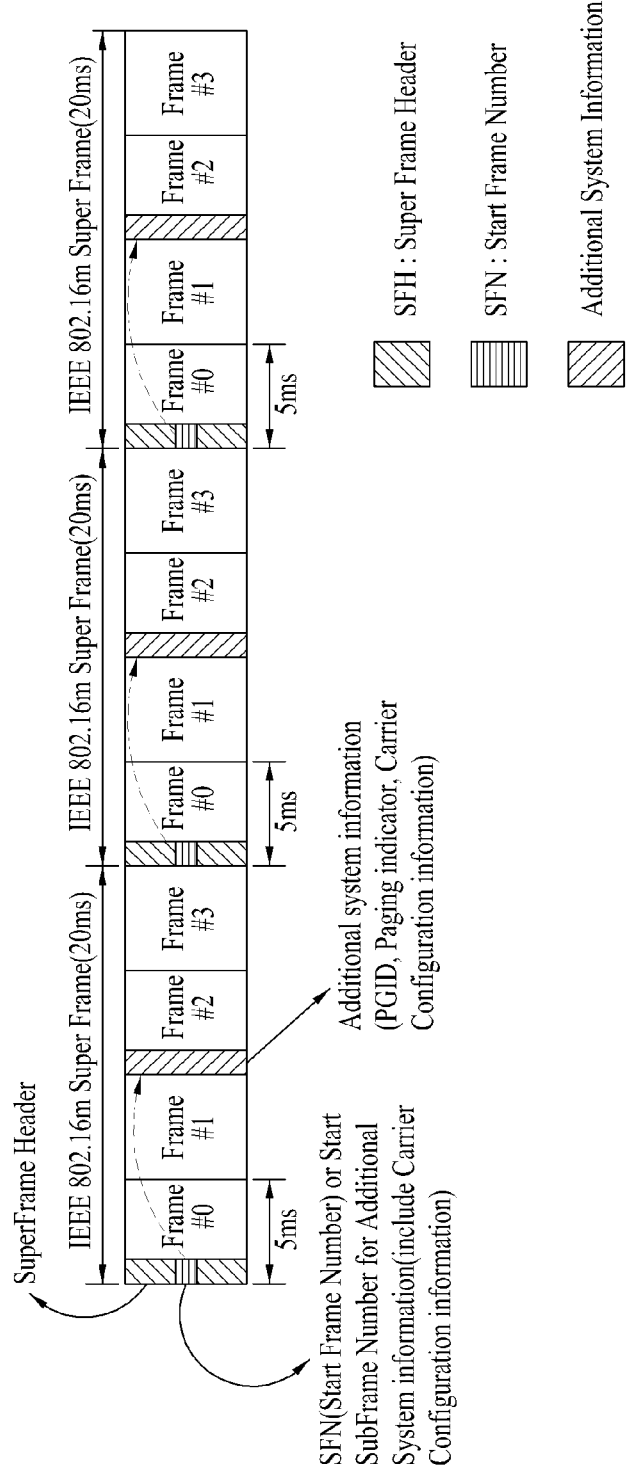
FIG. 3 is a diagram illustrating an example of a frame structure used in an IEEE 802.16m system.
Figure 4:
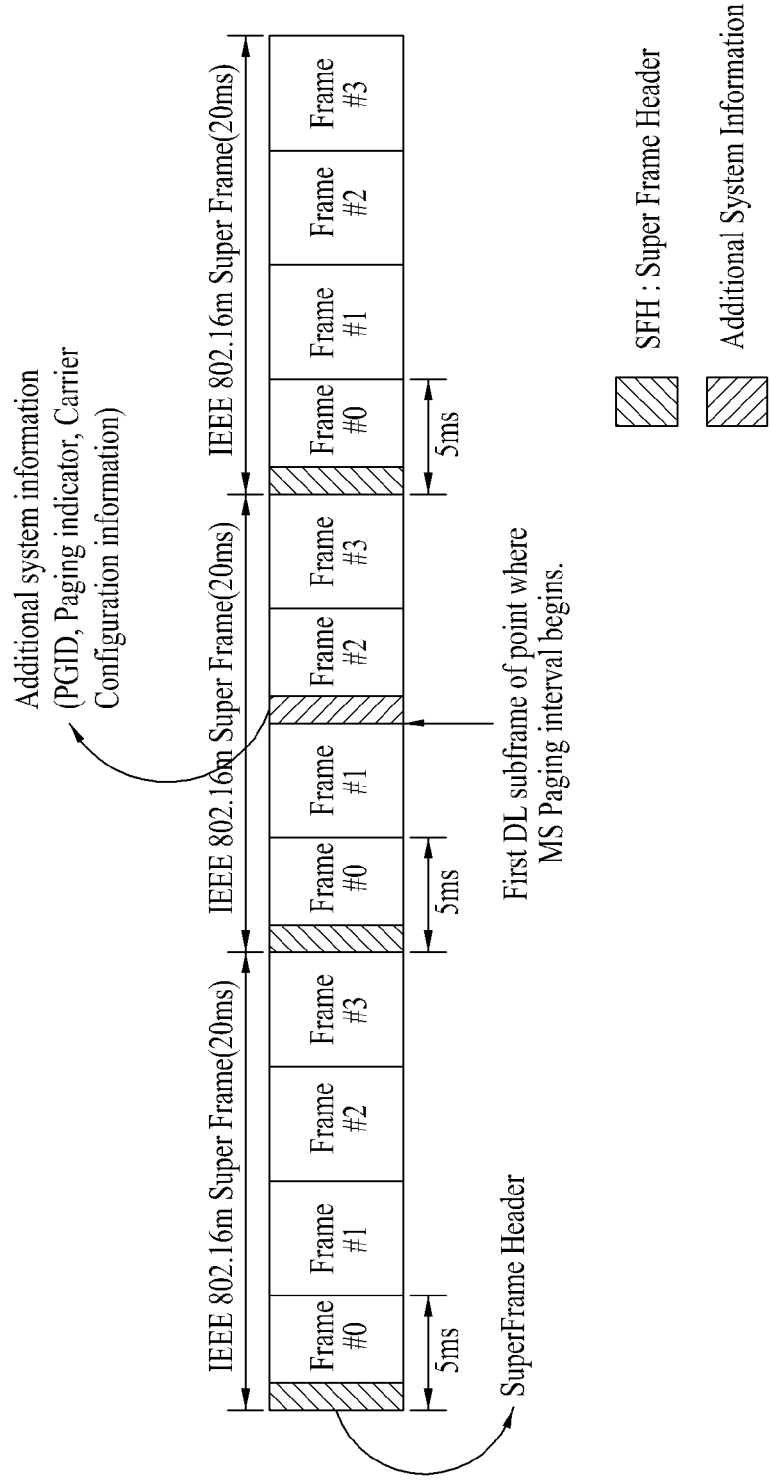
FIG. 4 is a diagram illustrating a superframe based on a duplex mode used in an IEEE 802.16m system.

FIG. 3 is a diagram illustrating an example of a frame structure used in an IEEE 802.16m system, and FIG. 4 is a diagram illustrating a superframe based on a duplex mode used in an IEEE 802.16m system.

Referring to FIG. 3, a radio frame includes superframes SU0 to SU3 of 20 ms that support a bandwidth, for example, 5 MHz, 8.75 MHz, 10 MHz or 20 MHz. Each superframe includes four frames F0 to F3 of 5 ms having the same size, and starts with a super frame header (SFH). The super frame header can be located within the first subframe as illustrated in FIG. 3, and is used to transmit essential system parameter and system configuration information.

The super frame header can include a physical broadcast channel through which general broadcast information or advanced broadcast information (ABI) is broadcasted. The user equipment synchronized with the base station can acquire broadcast information within the cell by receiving the physical broadcast channel.

Each frame in the superframe includes 8 subframes (SF0-SF7).

The frame structure can be applied to a frequency division duplex (FDD) mode, a half frequency division duplex (H-FDD) mode, a time division duplex (TDD) mode, etc. Referring to FIG. 4, since downlink transmission and uplink transmission are identified by frequency in the FDD mode, one frame includes either downlink subframes (D) or uplink subframes (U). In the FDD mode, an idle time can exist at the end of each frame. On the other hand, since downlink transmission and uplink transmission are identified by time in the TDD mode, subframes within the frame are classified into a downlink subframe (D) and an uplink subframe (U). An idle time referred to as a Transmit/receive Transition Gap (TTG) exists while the downlink is being changed to the uplink. Also, idle time referred to as a Receive/transmit Transition Gap (RTG) exists while the uplink is being changed to the downlink.

Referring to FIG. 3 again, each subframe includes a plurality of OFDMA symbols in a time domain and a plurality of subcarriers in a frequency domain. The OFDMA symbols may be referred to as OFDMA symbols or SC-FDMA symbols depending on a multiplexing access mode. The number of OFDM symbols included in one subframe can be varied within the range of 5 to 7 depending on channel bandwidth and CP length. A type of the subframe can be defined depending on the number of OFDM symbols included in the subframe. For example, the type of the subframe can be defined in such a manner that subframe type-1 includes six OFDMA symbols, subframe type-2 includes seven OFDMA symbols, subframe type-3 includes five OFDMA symbols, and subframe type-4 includes nine OFDMA symbols. One frame may include one type of subframes or different types of subframes.

The aforementioned structure described with reference to FIG. 3 and FIG. 4 is only exemplary. Accordingly, various modifications can be made in the length of the superframe, the number of frames included in the superframe, the number of subframes included in the frame, the number of OFDMA symbols included in the subframe, and parameters of OFDMA symbols. For example, the number of subframes included in the frame can be varied depending on the channel bandwidth and the CP length.

If the DAS is used in the conventional CAS, a frame structure used in the CAS can be used to transmit and receive a signal to and from the user equipment through a plurality of DAs. The frame structure used in the IEEE 802.16m system illustrated in FIG. 3 and FIG. 4 may be used by a frame interval used in the CAS and a frame interval used in the DAS. For example, a frame interval for a relay station used for a relay function in the IEEE 802.16m system can be used as a frame interval for transmitting and receiving a signal to and from the user equipment through a DA or DA group in the DAS according to one embodiment of the present invention.

Hereinafter, in order to describe a frame structure in the DAS according to one embodiment of the present invention, a wireless communication that uses a relay station will be described in brief.

Generally, since signal transmission and reception is performed through a direct link between the fixed base station and the user equipment in the wireless communication system, a wireless communication link having high reliability between the base station and the user equipment can be configured easily. However, since the location of the base station can be fixed in the wireless communication system, there is little flexibility in configuration of the wireless network, and it is difficult to provide an efficient communication service under the wireless environment where traffic distribution or call requirements is severely changed. Accordingly, in order to solve these problems, a multi-hop relay type wireless communication service can be used based on a fixed relay station or a relay station having mobility.

Figure 5:
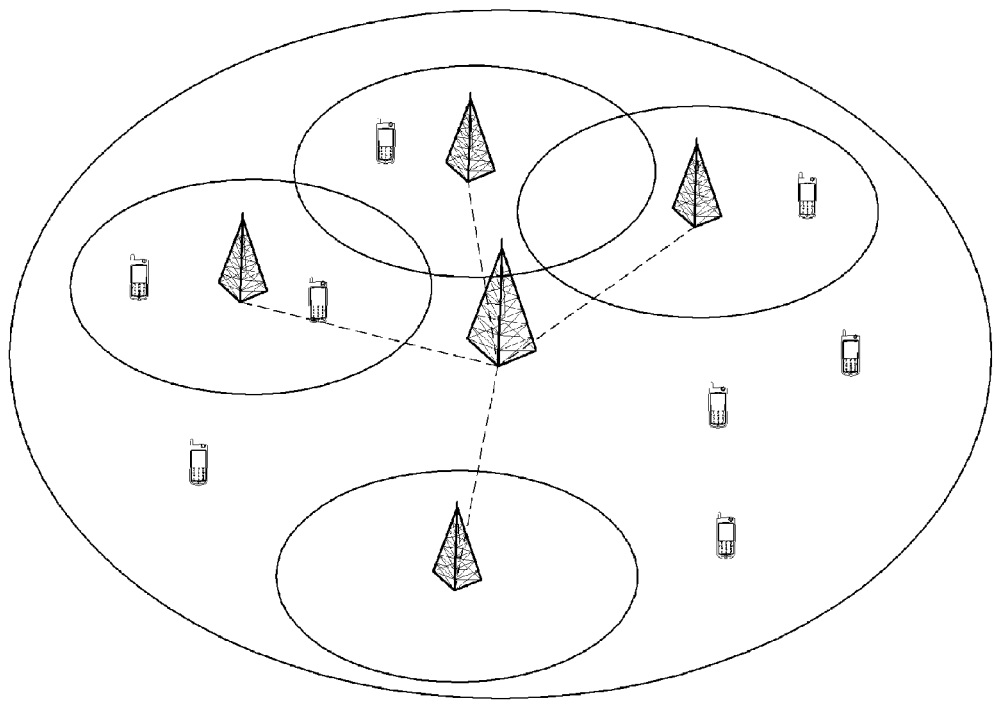
FIG. 5 is a diagram illustrating a network that performs wireless communication based on a relay station.

FIG. 5 is a diagram illustrating a network that performs wireless communication based on a relay station.

Referring to FIG. 5, the wireless communication system based on the relay station can reconfigure a network by quickly reacting to change of the communication environment, and can manage the entire wireless network more efficiently. For example, the wireless communication system based on the relay station can extend a cell service zone and increase system capacity. In other words, if the channel status between the base station and the user equipment is not good, a relay station is provided between the base station and the user equipment and a relay station path is configured through the relay station, whereby a radio channel having a more excellent channel status can be provided to the user equipment.

Also, as the relay station is used in a cell edge zone having a poor channel status from the base station, a data channel of higher speed can be provided, and the cell service zone can be extended.

Figure 6:
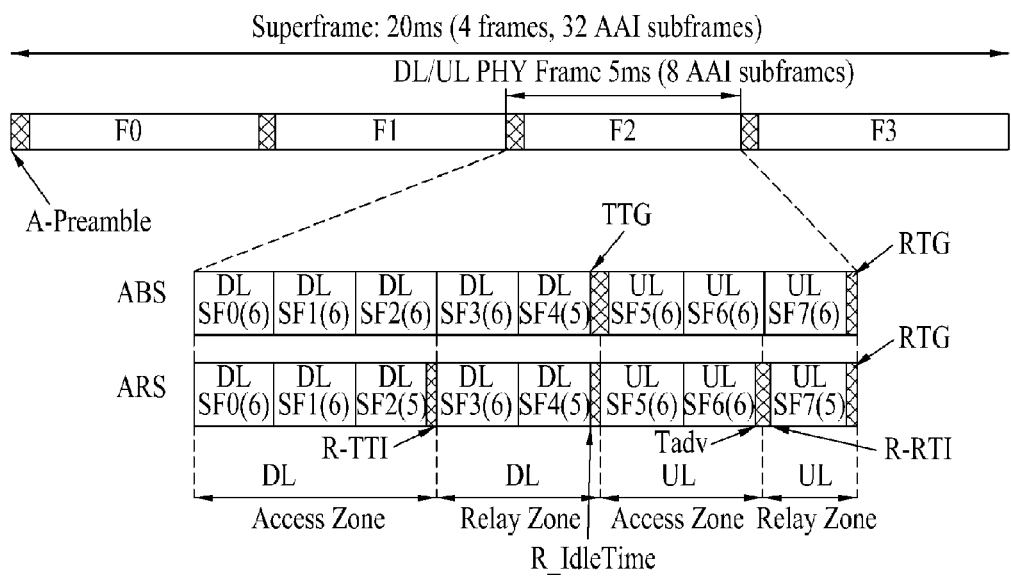
FIG. 6 is a diagram illustrating an example of a frame structure used in a wireless communication system that performs a relay function.

FIG. 6 is a diagram illustrating an example of a frame structure used in a wireless communication system that performs a relay function. In more detail, FIG. 6 illustrates a frame structure for a base station and a relay station in a TDD mode of the IEEE 802.16m system.

Referring to FIG. 6, the frame structure considering that the relay station is supported in the IEEE 802.16m system includes a frame structure for an advanced base station (ABS) and a frame structure for an advanced relay station (ARS). In the TDD mode, the base station and the relay station can use the same frequency band, and for convenience of description, the ABS frame and the ARS frame can be illustrated respectively in FIG. 6.

In each frame structure, the data interval includes an uplink subframe (UL) and a downlink subframe (DL), wherein each subframe can be allocated to an access zone and a relay zone, respectively. The access zone is an interval where the base station or the relay station transmits and receives a signal to and from the user equipment, and the relay zone is an interval where signal transmission and reception is performed between the base station and the relay station.

At this time, at the relay zone, the user equipment does not perform any transmission and reception operation with the base station. In more detail, whether the user equipment is operated at the relay zone is determined depending on signaling/setting. For example, in case of signaling such as 16m_Relay_zone_AMS_allocation_indicator=1, the user equipment can perform the transmission and reception operation with the base station at the relay zone. On the other hand, in case of signaling such as 16m_Relay_zone_AMS_allocation_indicator=0, the user equipment is not operated at the relay zone.

In the radio frame structure illustrated in FIG. 6, the downlink access zone is an interval where the base station or the relay station transmits uplink data to the user equipment, and the uplink access zone is an interval where the user equipment transmits uplink data to the base station or the relay station. The downlink relay zone is an interval where the base station transmits downlink data to the user equipment, and the relay station can transmit the received downlink data to the user equipment at the downlink access zone. The uplink relay zone is an interval where the relay station transmits uplink data to the base station, and the relay station can transmit the uplink data received from the user equipment to the base station at the uplink access zone.

The relay station is operated as a transmission mode for transmitting a signal to the user equipment, at the downlink access zone, whereas it is operated as a reception mode for receiving a signal from the base station after synchronizing with the base station, at the downlink relay zone. Also, the relay station is operated as a reception mode for receiving a signal from the user equipment, at the uplink access zone, whereas it is operated as a transmission mode for transmitting a signal to the base station, at the uplink relay zone. Accordingly, in the ARS frame structure, an idle time referred to as relay-transmit to receive transition interval (R-TTI) exists while the downlink access zone is being shifted to the downlink relay zone, and an idle time referred to as relay-receive to transmit transition interval (R-RTI) exists while the uplink access zone is being shifted to the downlink relay zone. The R-TTI and the R-RTI may correspond to one OFDM symbol or may be smaller than one OFDM symbol.

In the wireless communication system based on the relay station, the relay station relays all data and control information between the base station and the user equipment, and can be controlled by a centralized scheduler of the base station. In this respect, although the wireless communication system based on the relay station may seem similar to the DAS, the relay station can be differentiated from the DAS in that it is connected with the base station and the user equipment through wireless, wherein the DAS includes one or more DAs connected with the base station through cable.

The present invention is intended to suggest a method of transmitting a signal using a frame structure having a relay zone by considering that a separate relay station is not used in a wireless communication system based on distributed nodes (e.g., distributed antennas). In the present invention, a separate multi-node zone (e.g., DAS zone) can be defined, which performs communication with the user equipment through one or more DAS antennas in the radio frame structure. However, since the DAS zone may cause a problem in view of compatibility with the existing system that does not support a DAS, some zone of the radio frame structure which is previously defined may be used instead of the DAS zone. For example, if no relay station exists, the relay zone may be used instead of the DAS zone.

Hereinafter, in one embodiment of the present invention, the DAS zone will be defined as an interval where the base station can perform transmission and reception with the user equipment through one or more DAs in the frame structure.

Figure 7:
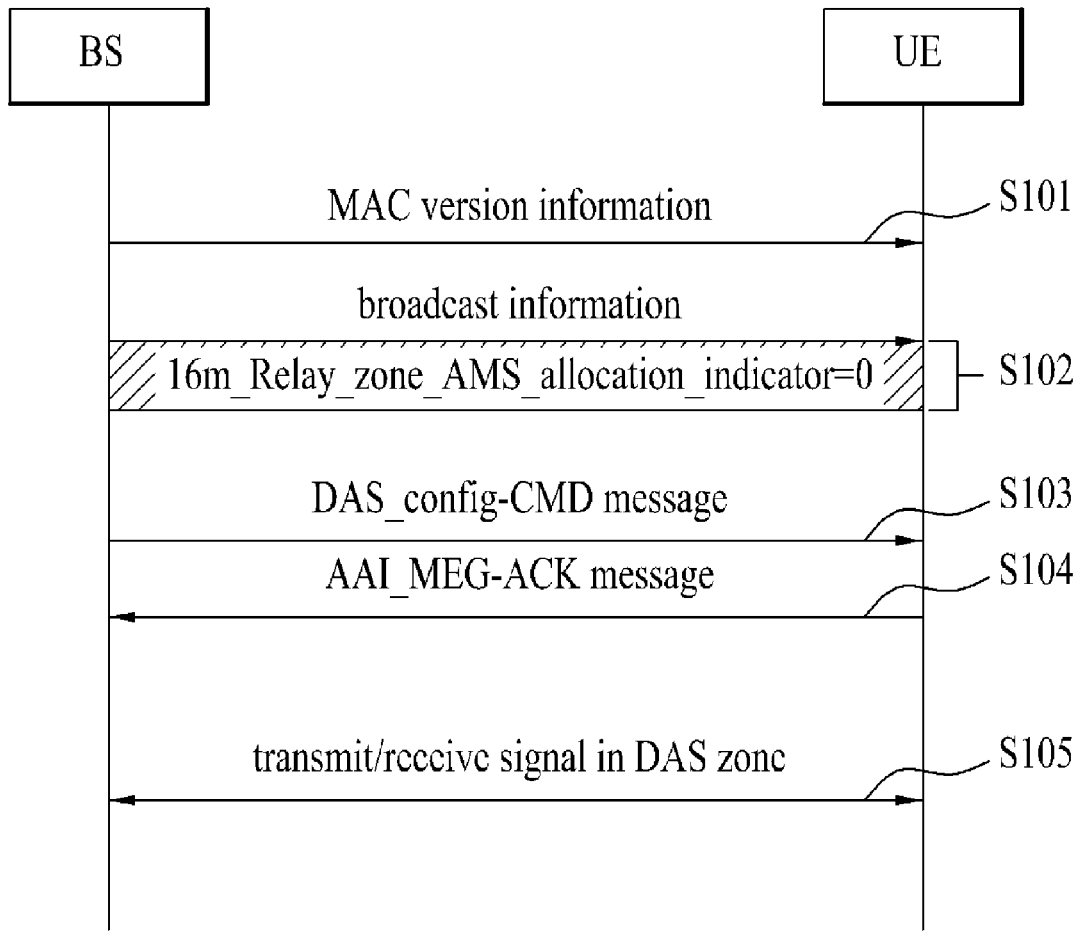
FIG. 7 is a flow chart illustrating an example of a procedure of transmitting and receiving a signal between a base station and a user equipment in a DAS according to one embodiment of the present invention.

FIG. 7 is a flow chart illustrating an example of a procedure of transmitting and receiving a signal between a base station and a user equipment in a DAS according to one embodiment of the present invention. In more detail, FIG. 7 illustrates an example of a procedure of transmitting and receiving a signal in the IEEE 802.16m system.

Referring to FIG. 7, the base station broadcasts media access control (MAC) version information included in system configuration information into a cell zone (S101). At this time, the MAC version information can be represented by a type, length, value (TLV) parameter indicating version of the system. The MAC version information according to one embodiment of the present invention includes a TLV parameter indicating that the system of the present invention may be the IEEE 802.16m system based on the DAS, in which a relay station does not exist.

Table 1 illustrates an example of the TLV parameter indicating version of the system.

TABLE 1

| Type | Length | Value | Scope |
|---|---|---|---|
| 148 | 1 | Version number of IEEE 802.16 supported on this channel0: Reserved1-7: Indicates conformance with an earlier and/or obsolete version of IEEE 802.168: Indicates conformance with IEEE Std 802.16-20099: Indicates conformance with IEEE Std 802.16-2009 and IEEE Std 802.16j-200910: Indicates conformance with IEEE Std 802.16-2009, IEEE Std 802.16j-2009 and IEEE Std 802.16m-2010 11: Indicates conformance with IEEE Std 802.16x supporting DAS (and IEEE Std 802.16j-2009)12-255: Reserved | PMP:DCD, RNG-REQ |

Referring to Table 1, if the TLV parameter included in the MAC version information has a value of '1-7', it indicates that the corresponding system is the system of initial version of the IEEE 802.16. If the TLV parameter has a value of '8', it indicates that the corresponding system is the system of IEEE Std 802.16 version. If the TLV parameter has a value of '9', it indicates that the corresponding system is the system of IEEE Std 802.16 and IEEE Std 802.16j version. If the TLV parameter has a value of '10', it indicates that the corresponding system is the system of IEEE Std 802.16, IEEE Std 802.16j and IEEE Std 802.16m version. If the TLV parameter has a value of '11', it indicates that the corresponding system is the IEEE system (for convenience, referred to as IEEE Std 802.16x), which supports the multi-node system (e.g., DAS) in accordance with one embodiment of the present invention. The IEEE Std 802.16x system can include the system of IEEE Std 802.16m version or the system of next version that can be configured in the future. If the TLV parameter has a value of '11', the corresponding system may be set to support the IEEE Std 802.16j, or may be set not to support the IEEE Std 802.16j. If the corresponding system is set not to support the IEEE Std 802.16j, the value '11' of the TLV parameter indicates that the corresponding system is the system which supports a DAS without using a relay station. On the other hand, if the corresponding system is set to support the IEEE Std 802.16j, the value '11' of the TLV parameter indicates that the corresponding system is the system which supports both a relay station and a DAS.

In other words, as an example of transmitting information on the DAS, the base station according to one embodiment of the present invention can transmit system information indicating that the IEEE 802.16 system, which can use a relay station, does not use the relay station but uses a DAS, or can transmit system information indicating that the corresponding system uses MAC version set in accordance with a DAS.

1. First Embodiment

Referring to FIG. 7, in step S101 of transmitting the MAC version information of the system, the base station according to one embodiment of the present invention can set the value of the TLV parameter included in the MAC version information of the system to '9' or '10' in accordance with Table 1 to indicate that the corresponding system is the IEEE 802.16j system which can use the relay station. If the MAC version is newly defined, since information on the newly defined MAC version for the DAS is not set in the user equipment used in the existing system, a problem occurs in that the user equipment may fail to recognize the system information broadcasted from the base station.

Afterwards, the base station broadcasts control information into the cell, wherein the control information indicates that some of the frame structure used in the wireless communication system according to the present invention is used as the DAS zone (S102). The control information may be indicated using a separate parameter, or may be indicated indirectly using relay zone allocation information. For example, in order to use the relay zone as the DAS zone, control broadcast information (for example, 16m_Relay_zone_AMS_allocation_indicator=0) can be used, wherein the control broadcast information indicates that the relay zone is not allocated to the user equipment. In other words, an indicator indicating whether the relay zone of the user equipment is used may be used as an indicator indicating whether the DAS zone is used. To this end, the user equipment that supports a DAS may previously be notified by separate signaling that the corresponding base station does not use the relay station. In more detail, in case of control broadcast information, 16m_Relay_zone_AMS_allocation_indicator=1, the user equipment that has received this control broadcast information can perform communication with the base station even at the relay zone regardless of support of the DAS. On the other hand, the user equipment for CAS, which has received control broadcast information set to '0,' is not operated at the relay zone. However, the user equipment for DAS can recognize that the relay zone is used as the DAS zone if information related to the operation in the DAS is previously set, and can perform signal transmission and reception to and from the base station at the relay zone.

2. Second Embodiment

The base station can transmit information indicating that the corresponding system is based on the DAS to the user equipment through MAC version which is newly defined.

Referring to FIG. 7, the base station sets to the value of the TLV parameter in accordance with the example of Table 1 to indicate system configuration information indicating that no relay station exists within the system and the DAS is used therein, and broadcasts the system configuration information into the cell (S101). Referring to the example of Table 1, if the value of the TLV parameter indicates that the corresponding system is the system which supports a DAS without using a relay station, the user equipment that has received the MAC version information can recognize the radio frame structure that includes the DAS zone.

In the mean time, if the value of the TLV parameter indicates that the corresponding system supports both a relay station and a DAS, the base station can notify the user equipment for a DAS, through separate signaling/setting, that the relay station is not used, thereby using the relay zone as the DAS zone. Accordingly, the base station transmits the control broadcast information (16m_Relay_zone_AMS_allocation_indicator=0) illustrated in FIG. 7 (S102).

As the base station transmits MAC version information and control information of the system to one or more user equipments located within a cell in accordance with the aforementioned embodiments, if information indicating that a radio frame structure, which includes a DAS zone, is used is transmitted, the base station can broadcast detailed information (parameter) for configuration of the DAS zone (S103). For example, the base station can transmit a message (DAS_config-CMD message), which includes configuration information for a DAS zone, to the user equipment. One or more parameters for configuration of a DAS zone may be transmitted to the user equipment through a message (RS_config-CMD message) for configuration of a relay zone.

Table 2 illustrates examples of parameters for configuration of a DAS zone according to one embodiment of the present invention.

TABLE 2

| Parameter | Description |
| --- | --- |
| BS index | Information including BS_ID and index of a base station that performs scheduling for a system to which a user equipment currently belongs. |
| The number of Antennas in BS | A total number of CAS antennas and DAS antennas located within a cell zone scheduled by a base station. |
| The number of Antennas of BS | The number of CAS antennas included in a base station. |
| DA index | Information including DA_ID and index of one or more DAs constituting a DA zone where a user equipment is currently located. |
| The number of Antennas in DA | Information including index and the number of antennas constituting one or more DAs indicated by a DA index parameter. |
| Neighbor DAs information | Information including DA_ID, index of DAs currently located near a user equipment, and the number of antennas and index at each DA. |

Table 2 illustrates examples of parameters included in a message for configuration of a DAS zone. In addition, the message may further include information on the number of antennas for DAS included in the corresponding base station, or other broadcast information such as a parameter defined in SFH (SuperFrame Header). Moreover, transmission cycles of the parameters may be set uniformly or not.

The user equipment that has received the message carrying the parameters for configuration of a DAS zone transmits an acknowledgement (ACK) message (e.g., AAI_MSG-ACK message) for acknowledging the reception of the message (S104).

Afterwards, the base station performs communication with the user equipment, which belongs to the DAS and has received the broadcast information and message of the steps S101 to S103, at the DAS zone (S105).

Figure 8:
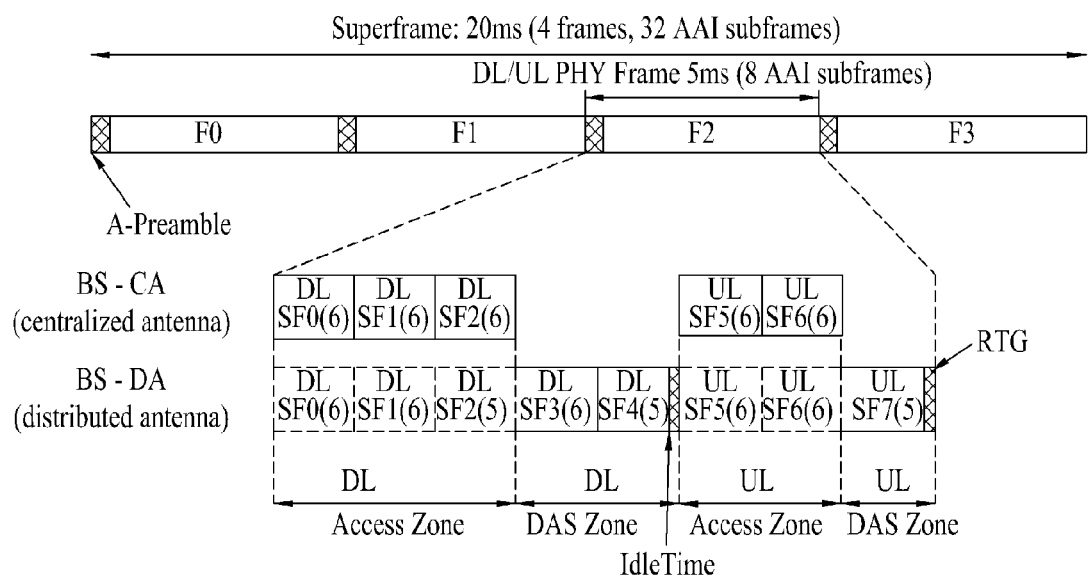
FIG. 8 is a diagram illustrating an example of a frame structure used in a wireless communication system that uses a DAS according to one embodiment of the present invention.

FIG. 8 is a diagram illustrating an example of a frame structure used in a wireless communication system that uses a DAS according to one embodiment of the present invention. In more detail, FIG. 8 illustrates a frame structure in a TDD mode.

Referring to FIG. 8, the frame structure according to one embodiment of the present invention includes a frame structure (e.g., BS-CA frame in FIG. 8) used in the CAS and a frame structure (e.g., BS-DA frame in FIG. 8) used in the DAS. A data interval of each frame structure is divided into an access zone and a DAS zone, wherein the access zone is used for signal transmission and reception between the base station and the user equipment, which belong to the wireless communication system of the related art, i.e., the CAS, and the DAS zone is used for signal transmission and reception between the base station and the user equipment, which belong to the DAS. This is not to affect communication performed by the user equipment supported by the standard according to the existing CAS.

At the access zone, the base station can transmit and receive a signal to and from the user equipment by using either a CA located at the center within a cell or a plurality of DAs distributed within a cell and spaced apart from one another at a predetermined distance.

Whether the base station and the user equipment are operated at the access zone can be determined depending on whether the base station and the user equipment belong to the existing communication system, i.e., the CAS, or are set to support the DAS. For example, if the user equipment synchronized with the base station does not support the DAS, the base station can perform communication with the user equipment by using the CA only at the access zone. For another example, if the user equipment is set to support both the CAS and the DAS, the base station can perform communication with the user equipment by using one or more of the CA and the DA constituting the DA zone where the user equipment is located, at the access zone. Alternatively, the base station can perform communication with the user equipment, which is set to support the DAS, at the DAS zone only. At the downlink access zone, MAC version information and broadcast information are broadcasted in accordance with the steps S101 and S102 illustrated in FIG. 7, wherein the MAC version information indicates that the corresponding system is the system based on the DAS and the broadcast information indicates that a certain data interval of the frame structure is used as the DAS zone. Also, the message (for example, DAS-config-CDM message transmitted in step S103 of FIG. 7), which includes DAS zone configuration parameters required for the operation of the user equipment at the DAS zone, can be transmitted. As the aforementioned broadcast information and the parameters required for the DAS zone are transmitted, among the user equipments that have received the broadcast information and the parameters, the user equipment that supports the DAS is not operated at the access zone but can perform the transmission and reception operation at the DAS zone.

The DAS zone is the interval where the base station transmits and receives a signal to and from the user equipment by using the DA, and can be divided into a downlink DAS zone and an uplink DAS zone. The base station can transmit a signal to and from the user equipment located within the DA zone formed by a plurality of DAs or DA groups through the plurality of DAs or DA groups. It is assumed that the CA is not operated at the DAS zone.

The user equipment is operated as a reception mode at the downlink access zone and the downlink DAS zone, whereas it is operated as a transmission mode at the uplink access zone and the uplink DAS zone.

For convenience of description, the frame structure illustrated in FIG. 8 illustrates that the relay zone of the related art is used as the DAS zone in the frame structure used in the IEEE 802.16m considering the relay station. However, the frame structure is not limited to the aforementioned embodiment. Some of subframe at the data interval may be used as the DAS zone. Also, although the frame structure in the TDD mode has been exemplarily described, the relay zone may be used as the DAS zone in FDD mode or H-FDD mode, or a separate DAS zone may be configured for communication with the user equipment included in the DAS.

Figure 9:
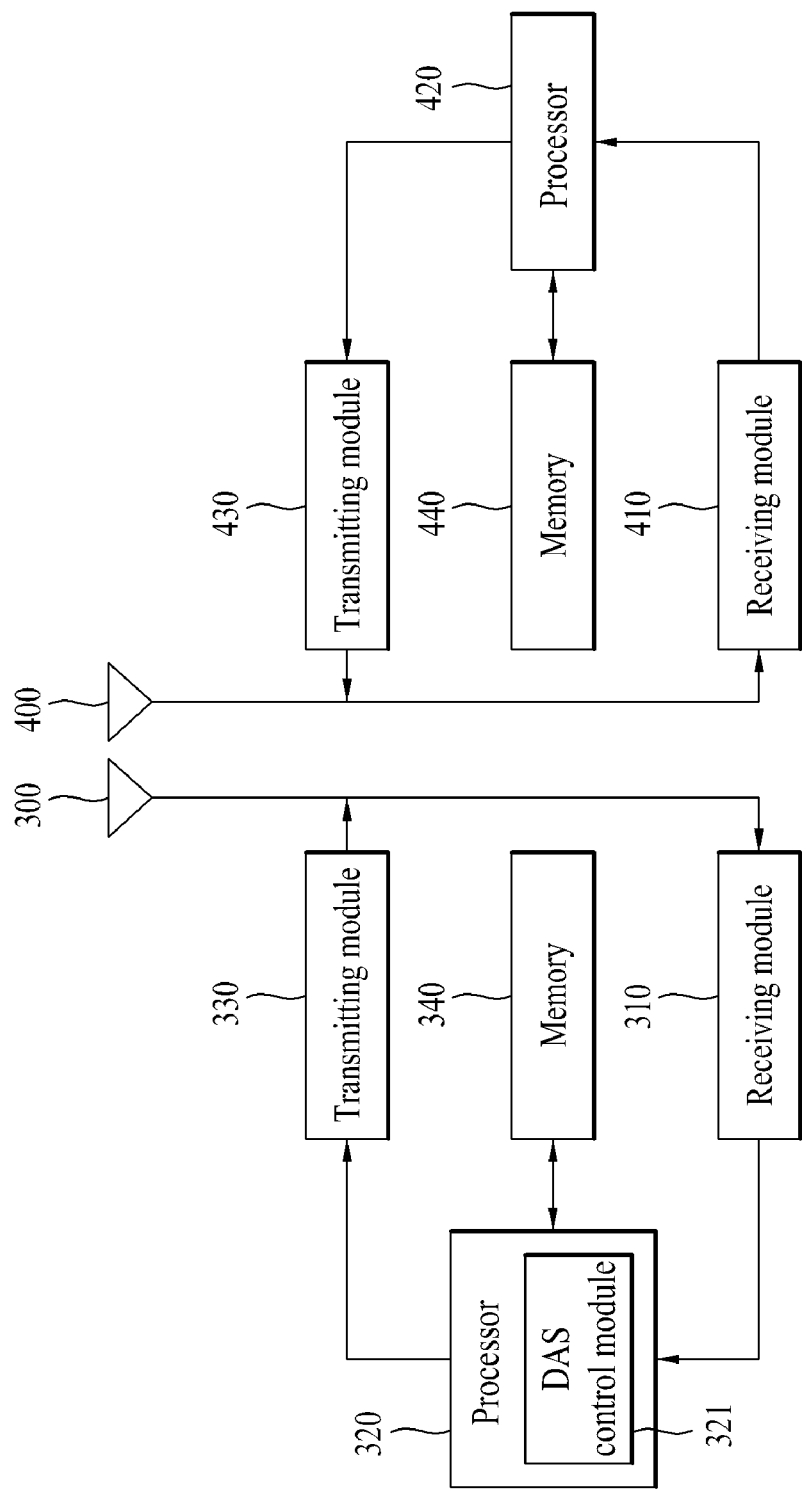
FIG. 9 is a block diagram illustrating a user equipment and a base station, in which the embodiments of the present invention can be carried out, in accordance with another embodiment of the present invention.

FIG. 9 is a block diagram illustrating a user equipment and a base station (FBS, MBS), in which the embodiments of the present invention can be carried out.

The user equipment is operated as a transmitter in an uplink, whereas the user equipment is operated as a receiver in a downlink. Also, the base station is operated as a receiver in the uplink, whereas the base station is operated as a transmitter in the downlink. In other words, each of the user equipment and the base station can include a transmitter and a receiver for transmission and reception of information or data.

The transmitter and the receiver can include a processor, a module, a part, and/or a means, for which the embodiments of the present invention are carried out. In particular, the transmitter and the receiver can include a module (means) for encoding messages, a module for decoding the encoded messages, and an antenna for transmitting and receiving messages. An example of the transmitter and the receiver will be described with reference to FIG. 9.

Referring to FIG. 9, the left side represents a structure of the transmitter while the right side represents a structure of the receiver. For description of the aforementioned embodiments, the transmitter represents an example of a base station which belongs to the DAs, and the receiver represents a random one of a plurality of user equipments located within the cell supported by the base station. Each of the transmitter and the receiver can include an antenna 300, 400, a receiving module 310, 410, a processor 320, 420, a transmitting module 330, 430, and a memory 350, 450.

The antenna 300, 400 includes a receiving antenna receiving a radio signal from the outside and forwarding the received signal to the receiving module 310, 410, and a transmitting antenna transmitting a signal generated by the transmitting module 330, 430 to the outside. If a MIMO function is supported, two or more antennas may be provided. The antenna 300 of the transmitter as illustrated in FIG. 9 represents one or more DAs selected from a plurality of DAs spaced apart from one another within a specific zone such as a cell supported by the base station, among all antennas of the base station, wherein the one or more DAs are selected based on the channel status during communication between the transmitter and the receiver, the location of the user equipment, the distance between the base station and the user equipment, etc. The selected one or more DAs can be changed depending on location change of the receiver.

The receiving module 310, 410 performs decoding and demodulation for the radio signal received from the outside through the antenna to recover original data and then forward the recovered data to the processor 320, 420. The receiving module and the antenna may be replaced with a receiving unit for receiving a radio signal, unlike FIG. 9.

The processor 320, 420 generally controls the whole operation of the transmitter or the receiver. In particular, the processor 320, 420 can perform a controller function for performing the aforementioned embodiments of the present invention, a medium access control (MAC) frame variable control function based on service characteristics and radio wave condition, a handover function, an authentication and encryption function, etc.

The transmitting module 330, 430 performs predetermined coding and modulation for data, which are scheduled from the processor 320, 420 and then transmitted to the outside, and then transfers the coded and modulated data to the antenna. The transmitting module and the antenna may be replaced with a transmitting unit for transmitting a radio signal, unlike FIG. 9.

The memory 340, 440 may store a program for processing and control of the processor 320, 420, or may perform a function for temporarily storing input/output data (in case of the user equipment, UL grant allocated from the base station), system information, station identifier (STID), flow identifier (FID), action time, etc. Also, the memory 340, 440 can include at least one type of a flash memory type, a hard disk type, a multimedia card micro type, a card type memory (for example, SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The processor 320 of the transmitter performs the whole control operation of the base station, and performs antenna resource allocation for selecting DA or DA group suitable for communication with the receiver. At this time, the processor 320 can include a DAS control module 321 that performs a control operation, whereby the frame structure that includes a DAS zone can be used in accordance with the aforementioned embodiment of the present invention. The DAS control module 321 may allow the relay zone to be used as the DAS zone in the wireless communication frame structure or may configure a separate DAS zone, as described above.

The receiver receives broadcast information broadcasted from the transmitter or transmitting signal through the receiving module 410. The user equipment, which is configured to support the DAS, can receive broadcast information and message, which include information indicating that the relay zone is used as the DAS zone, through the receiving module 410.

The processor 420 of the receiver also performs the whole control operation of the user equipment, and performs the whole operation required for communication such as synchronization with the base station based on the received broadcast information. Also, the processor 420 can determine the operation at the access zone and the DAS zone based on the message including parameters related to configuration of the DAS zone, the control information, and the system version information for the DAS zone according to one embodiment of the present invention, which are received through the receiving module 410.

In the mean time, the base station can perform a control function for performing the aforementioned embodiments of the present invention, an orthogonal frequency division multiple access (OFDMA) packet scheduling, time division duplex (TDD) packet scheduling and channel multiplexing function, a medium access control (MAC) frame variable control function based on service characteristics and radio wave condition, a quick traffic real-time control function, a handover function, an authentication and encryption function, a packet modulation and demodulation function for data transmission, a quick packet channel coding function and a real-time modem control function through at least one of the aforementioned modules, or can further include a separate means, module, or part for performing the aforementioned functions.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The embodiments of the present invention can be applied to a BS, a UE, or other communication devices in a wireless communication system.

The invention claimed is:

1. A method of transmitting a signal to a user equipment in a wireless communication system supporting distributed antenna system (DAS), the method performed by a base station and comprising:
  transmitting a first signal through a first zone of a radio frame using centralized antennas (CAs);
  transmitting a second signal through a second zone used for a backhaul link of a relay station in the radio frame using distributed antennas (DAs); and
  broadcasting system information through the first zone, wherein the system information indicates that the wireless communication system can use the relay station and perform communication at the second zone using the DAS instead of the relay station, wherein the first zone and the second zone are multiplexed by time division.

2. The method of claim 1, further comprising:
broadcasting control information into a cell zone through the first zone, wherein the control information indicates that the second zone is used as a DAS zone.

3. The method of claim 1, further comprising:
transmitting a message through the first zone, the message including configuration parameters for configuring the DAS.

4. The method of claim 3, wherein the configuration parameters include at least one of information on a total number of CAs and DAs of the base station, information on the number of DAs, index information of specific DAs associated with a user equipment that supports the DAS, information on the number of antennas corresponding to the specific DAs, and index information of antennas corresponding to the specific DAs.

5. A method of receiving a signal from a base station in a wireless communication system supporting a distributed antenna system (DAS), the method performed by a user equipment and comprising:
receiving a first signal through a first zone of a radio frame using centralized antennas (CAs);
receiving a second signal through a second zone used for a backhaul link of a relay station in the radio frame using distributed antennas (DAs); and
receiving system information through the first zone, wherein the system information indicates that the wireless communication system can use the relay station and perform communication at the second zone using the DAS instead of the relay station,
wherein the first zone and the second zone are multiplexed by time division.

6. The method of claim 5, further comprising downlink-receiving a message through the first zone, the message including configuration parameters for configuring the DAS.

7. The method of claim 6, wherein the configuration parameters include at least one of information on a total number of CAs and DAs of the base station, information on the number of DAs, index information of specific DAs associated with the user equipment, information on the number of antennas corresponding to the specific DAs, and index information of antennas corresponding to the specific DAs.

8. The method of claim 6, wherein the user equipment that has received the system configuration information, the control information and the message is not operated at the first zone.

9. A base station for transmitting a signal in a wireless communication system supporting a distributed antenna system (DAS), the base station comprising:
an antenna module including a plurality of centralized antennas (CAs) and a plurality of distributed antennas (DAs);
a transmitting module for transmitting a signal; and
a processor which is configured to:
multiplex a radio frame into a first zone and a second zone used for a backhaul link of a relay station through time-division,
transmit a first signal at the first zone through the CAs, and transmit a second signal at the second zone using the distributed antennas (DAs); and
broadcast system information through the first zone, wherein the system information indicates that the wireless communication system can use the relay station and perform communication at the second zone using the DAS instead of the relay station.

10. The base station of claim 9, wherein the processor generates system configuration information, control information, and configuration parameters, and transmits them through the first zone, the system configuration information indicating whether a wireless communication system to which the base station belongs supports the relay station and a DAS, the control information indicating that the second zone is used as a DAS zone where the base station and the user equipment, which belong to the DAS, are operated, and the configuration parameters configuring the DAS zone.

11. A user equipment for receiving a signal from a base station in a wireless communication system supporting a distributed antenna system (DAS), the user equipment comprising:
a receiving module;
a transmitting module; and
a processor which is configured to:
receive a first signal through a first zone of a radio frame using centralized antennas (CAs);
receive a second signal through a second zone used for a backhaul link of a relay station in the radio frame using distributed antennas (DAs); and
receive system information through the first zone, wherein the system information indicates that the wireless communication system can use the relay station and perform communication at the second zone using the DAS instead of the relay station,
wherein the first zone and the second zone are multiplexed by time division.

* * * * *